United States Patent [19]

Dorner et al.

[11] Patent Number: 4,865,515
[45] Date of Patent: Sep. 12, 1989

[54] APPARATUS FOR UNSTACKING AND STACKING CONTAINERS

[75] Inventors: Wolfgang C. Dorner, Oconomowoc; Dennis R. Gillette, Hartland, both of Wis.

[73] Assignee: Dorner Mfg. Corp., Hartland, Wis.

[21] Appl. No.: 65,907

[22] Filed: Jun. 24, 1987

[51] Int. Cl.⁴ .................. B65G 57/30; B65G 59/06
[52] U.S. Cl. ............................. 414/788.2; 221/297; 414/795.2; 414/797.5; 414/933
[58] Field of Search ............... 414/30, 95, 96, 125, 414/126, 127, 788.2, 795.2, 795.3, 797.4, 797.5; 221/186, 190, 297

[56] References Cited

U.S. PATENT DOCUMENTS

| | | | |
|---|---|---|---|
| 1,734,108 | 11/1929 | Bergmann et al. | 221/221 X |
| 2,947,125 | 8/1960 | Wilson et al. | 414/96 X |
| 3,053,402 | 9/1962 | Russell et al. | 414/96 X |
| 3,419,186 | 12/1968 | Cease | 221/297 X |
| 3,659,695 | 5/1972 | Reese | 414/96 X |
| 3,765,546 | 10/1973 | Westerling | 414/96 |
| 3,776,395 | 12/1973 | Lingg et al. | 414/96 X |
| 3,895,574 | 7/1975 | Nyborg | 414/96 X |
| 4,352,617 | 10/1982 | Sakai et al. | 414/95 |
| 4,439,101 | 3/1984 | Orlowski et al. | 414/126 |
| 4,597,705 | 7/1986 | Scheeler et al. | 414/30 |

FOREIGN PATENT DOCUMENTS

55-119629 9/1980 Japan ....................... 414/96

Primary Examiner—Robert J. Spar
Assistant Examiner—Janice Krizek
Attorney, Agent, or Firm—Andrus, Sceales, Starke & Sawall

[57] ABSTRACT

An apparatus for unstacking and stacking containers. The apparatus includes a frame defining a compartment to receive a stack of containers, and a guide mechanism mounted within the frame to guide the stack in vertical movement. Located beneath the compartment is a conveyor, which in the unstacking mode, will deliver a stack of containers to the compartment and discharge individual containers. A vertically movable lift mechanism is mounted in the frame and includes a plurality of pivotable lift members disposed to engage a rim on the second lowermost container, to elevate the stack, and a plurality of holding members mounted on the frame and disposed to engage the upper surface of the rim on the lowermost container to hold the lowermost container against elevation. After elevation of the stack, the separated lowermost container is in a ready position to be conveyed away on the conveyor, depending on a need in the conveying system. In the stacking mode of operation, individual containers are moved on the conveyor to a position beneath the compartment and each container is elevated in the compartment by the lift members and held in the elevated position by the holding members. A second container is then moved into the compartment and elevated into contact with the first container, moving the first container upwardly to form a stack, and the stack is held by the holding members. After completion of the stack, the stack can be lowered onto the conveyor and conveyed to a discharge site.

1 Claim, 5 Drawing Sheets

APPARATUS FOR UNSTACKING AND STACKING CONTAINERS

BACKGROUND OF THE INVENTION

In an automatic conveying system, small parts are frequently held in containers and the containers are conveyed through various work stations in the conveyor system. Empty containers are normally stored in stacked relation to save space and there is a need for a mechanism to automatically unstack the containers and feed the individual containers into the conveyor system.

Further, empty containers, after removal of parts, must be stacked add stored and again it is desirable to have a mechanism which will automatically stack the empty containers and feed the stack to a storage-area.

SUMMARY OF THE INVENTION

The invention is directed to an apparatus for unstacking or stacking containers. The containers to be stacked can have various configurations but in general, the containers have laterally extending rims or ledges which are spaced apart when the containers are in the stacked condition.

The apparatus comprises a supporting structure including a guide frame that defines a vertical compartment to receive a stack of containers, and a conveyor is positioned beneath the lower end of the compartment.

In the unstacking mode, a stack of containers is fed on the conveyor to the compartment and a plurality of lift members are moved into position under the rim of the second lowermost container and a plurality of movable holding members are moved into stripping position above with the upper surface of the rim on the lowermost container to strip the stack from the lowermost container and hold the lowermost container against vertical movement. On elevation of the lift members, the stack will be separated from the lowermost container on the conveyor. The separated lowermost container will then be in a ready position to be conveyed away on the conveyor depending upon need in the conveyor system.

On discharge of the separated lowermost container, the holding members are retracted, enabling the stack to be lowered onto the conveyor and the procedure is repeated to separate the then lowermost container from the remaining stack.

In the stacking mode, individual containers are fed on the conveyor into the compartment and each container is elevated above the conveyor by operation of the lift members and the elevated container is held in the elevated position by the holding members.

With the container elevated, a second container is moved into the compartment and elevated into contact with the first container to form a stack and the stack is held in the elevated position by operation of the holding members. This procedure is repeated with each individual container being elevated into contact with the previously formed stack, until the desired number of stacked containers is obtained. The stack is then lowered onto the conveyor and discharged to a storage site.

The apparatus of the invention acts to automatically unstack or stack containers and he apparatus can be switched from the unstacking mode to the stacking mode with minor adjustments of the mechanism.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
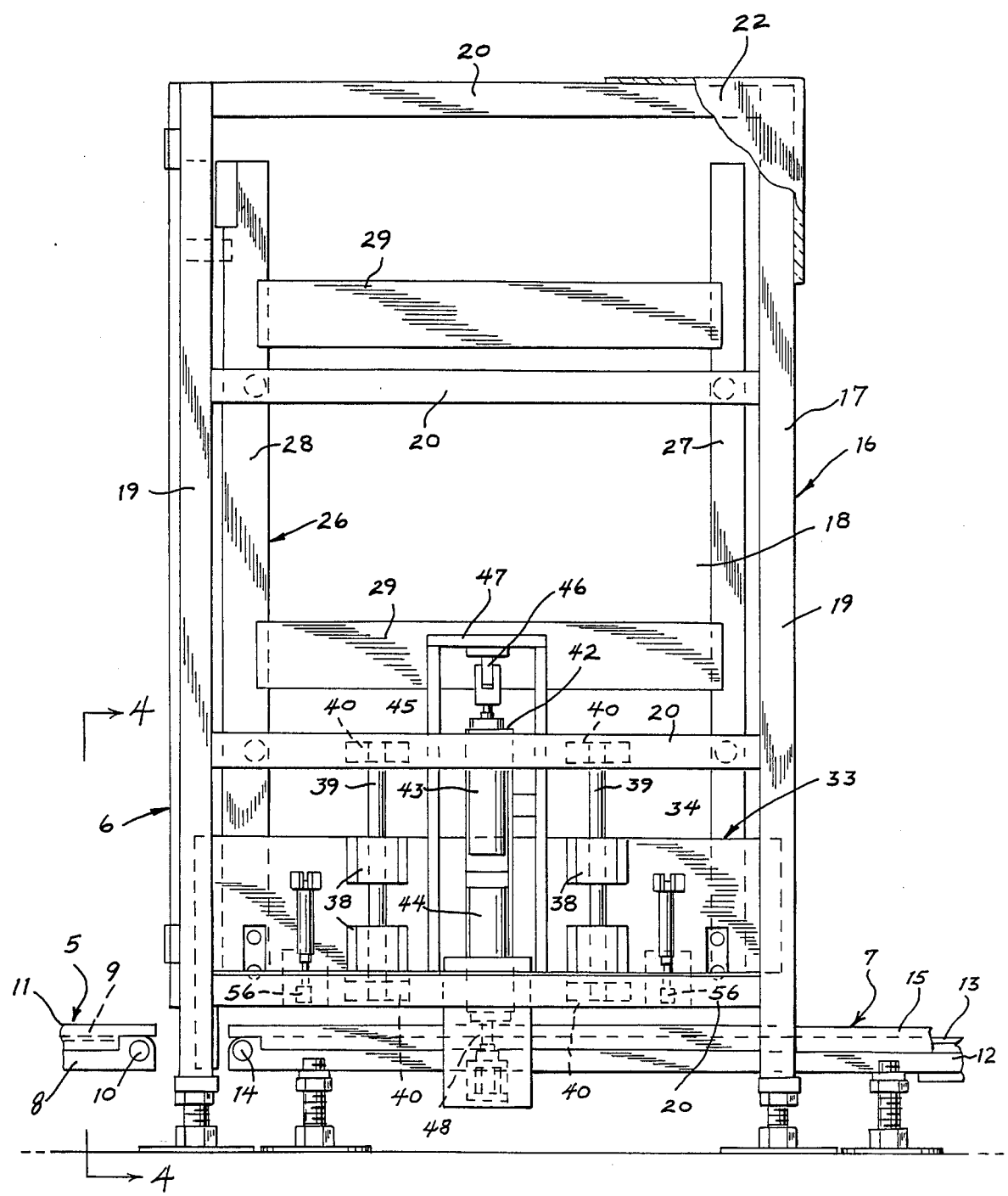
FIG. 1 is a side elevation of the apparatus of the invention.

FIGS. 1–5 illustrate an apparatus for unstacking containers 1. Each container 1 is provided with an outwardly extending rim or ledge 2 when the containers are stacked, the rims 2 of the stacked containers will be in vertically spaced relation.

In general, a stack 4 of containers 1 is conveyed by an in-feed conveyor 5 to an unstacking unit 6, and after unstacking, the individual containers 1 are discharged on conveyor 7 and conveyed to various work stations in the conveyor system.

In-feed conveyor 5 includes a frame 8 which supports an endless conveying belt 9. Belt 9 is carried by a pulley 10 which is journalled within one end of frame 8 and side guides 11 extend along the side edges of frame 8 to guide the stack in movement on the conveyor.

Discharge conveyor 7 has a similar construction to conveyor 5 and includes a frame 12 which supports a endless conveyor belt 13 for travel. Belt 13 is carried by a pulley 14 which is journalled in opposite sides of frame 12. Guides 15 are mounted along the opposite sides of frame 12 to guide the containers 1 being discharged from the unstacking unit 6.

The unstacking or stacking unit 6 is composed of a generally box-shaped cabinet or casing 16 having a tubular-frame 17 that defines a vertical compartment 18. Frame 17 includes four vertical columns 19, which are located at the corners of the frame, and columns 19 are connected by a series of beams 20 which extend parallel to the direction of movement of conveyors 5 and 7 as well as by a group of cross beams 21 which extend transversely to the movement of the conveyors. In practice, the frame 17 can be enclosed by transparent panels 22 which protect the enclosed apparatus yet enable the operation to be viewed. The lower portion of one of the panels 22 is provided with an opening 23 above conveyor 7 through which the individual containers 1 can pass.

Figure 2:
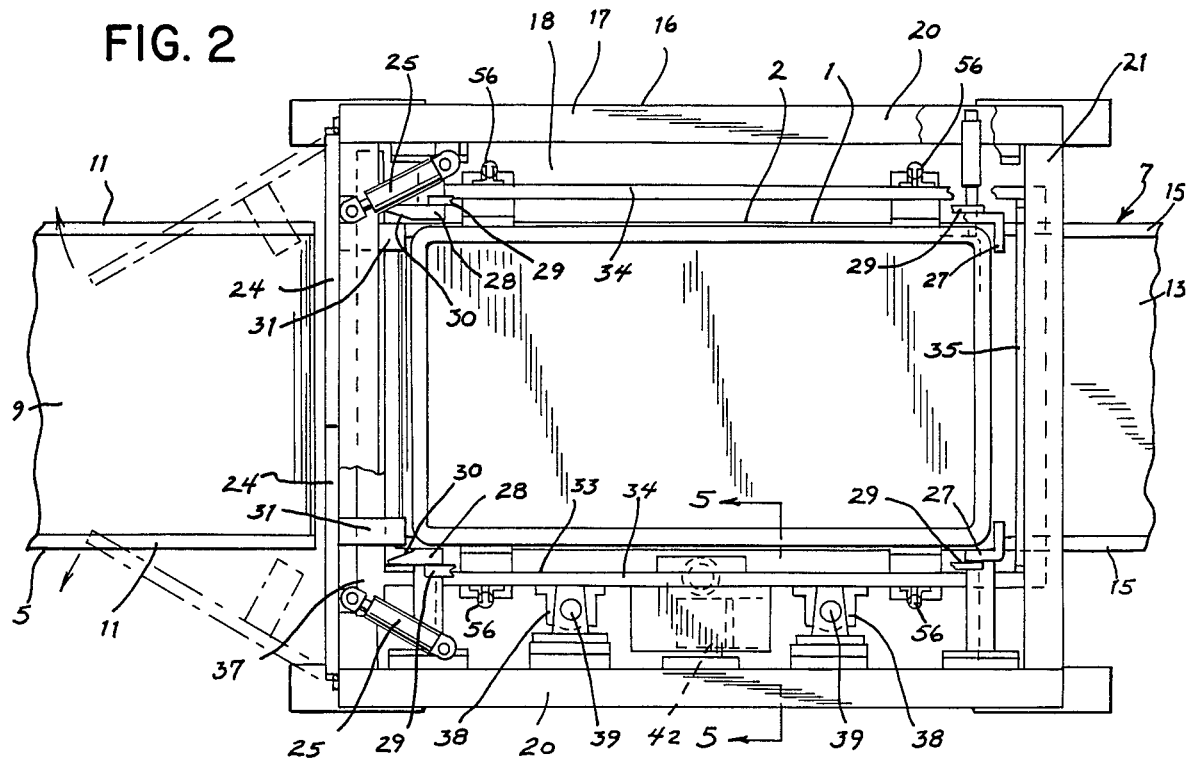
FIG. 2 is a top plan view of the apparatus.

The side of cabinet 16 opposite opening 23 is enclosed by a pair of doors 24 which are hinged to the columns 19 and can be moved between an open and closed positions. Doors 24 are preferably power operated and as best shown in FIG. 2, air cylinders 25 are connected between each door and the frame 17. By actuation of the cylinders 25 the doors can be moved between the closed and opened position. With the doors opened, a stack 4 of containers can be fed into the compartment 18.

Located within the main frame 17, is a guide frame 26 which guides the stack 4 in vertical movement within compartment 18. Guide frame 26 includes a pair of vertical angle shaped guides 27 and a pair of vertical guide strips 28 which are located upstream from guides 27. Longitudinal guide bars 29 connect the vertical guides 27 and 28 on each side of the frame 26. As best shown in FIG. 2, the upstream edges of guides 28 are tapered, as indicated by 30, and the tapered edges serve to guide the stack 4 into the guide frame 26. As the stack enters guide frame 26, the leading edges of the containers in the stack will engage and be stopped-by the guides 27. With the stack in position within the guide frame 26, doors 24 will then be closed and each door carries a vertical guide strip 31 which is disposed in proximate relation to the trailing end of the stack 4 when the doors are closed.

Figure 4:
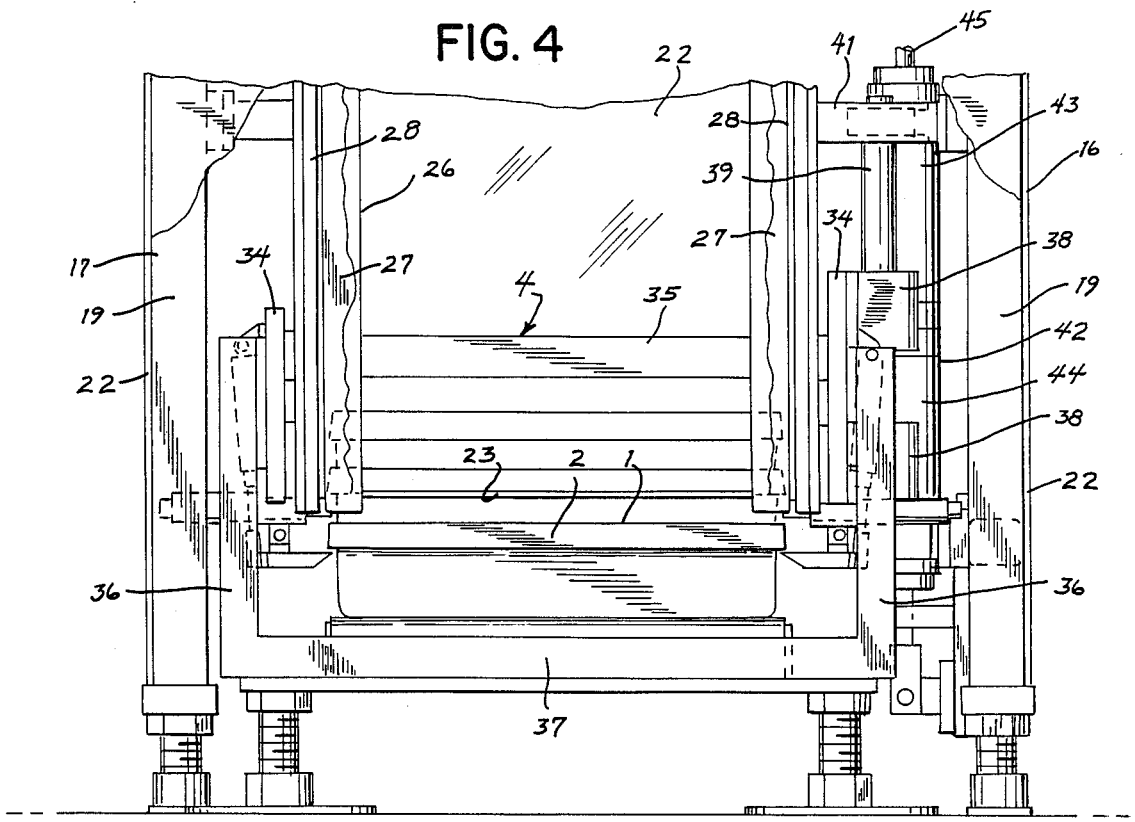
FIG. 4 is a fragmentary section taken along line 4—4 of FIG. 1.

A lift carriage 33 is mounted for vertical movement with respect to guide frame 26. As best shown in FIG. 2, lift carriage 33 includes a pair of side plates 34 which are connected at their downstream ends by a cross beam 35. As shown in FIG. 4, a leg 36 extends downwardly from the upstream end of each side plate 34 and the lower ends of legs 36 are connected together by a cross beam 37. The lowered cross beam 37 permits the stack 4 to be moved into the guide frame 26 without interference.

Figure 3:
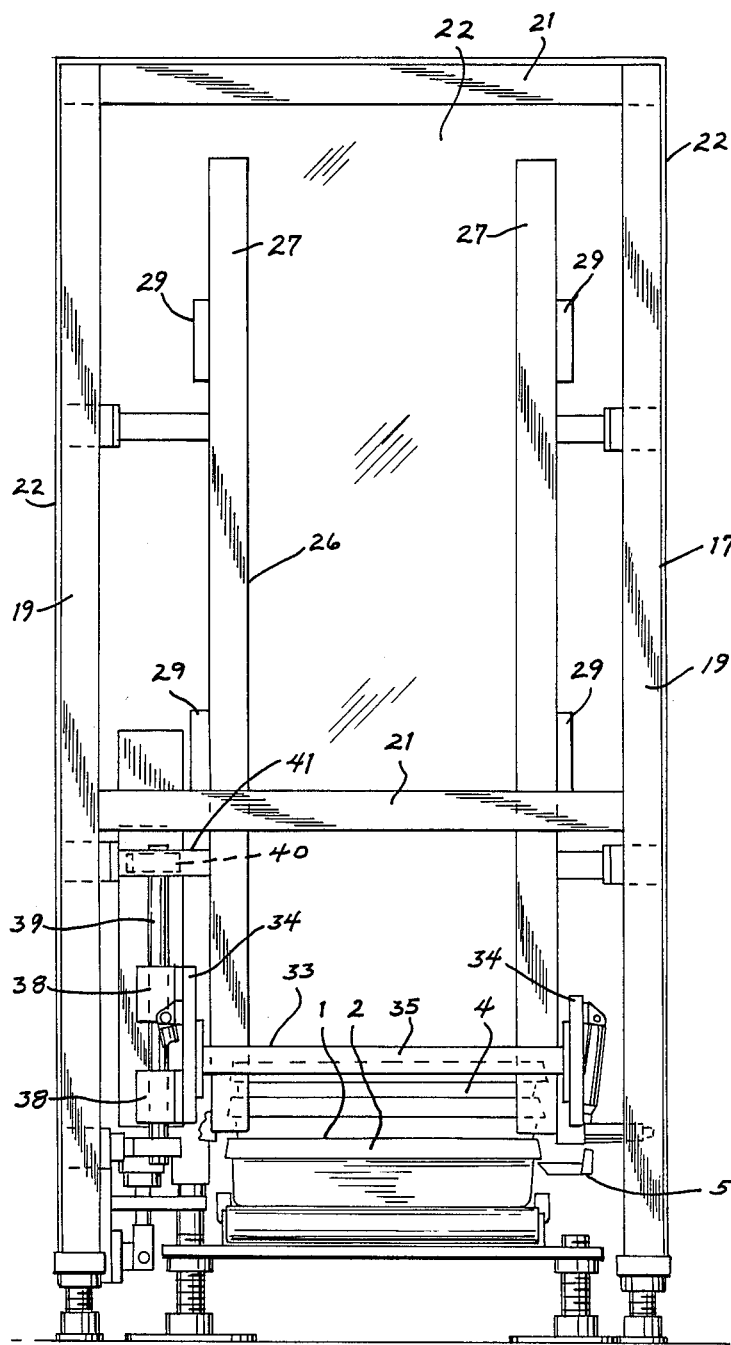
FIG. 3 is an end view of the apparatus shown in FIG. 1.

Lift carriage 33 is mounted for vertical movement relative to guide frame 26 and in this regard a plurality of bearing blocks 38 are secured to the outer surface of one of the side plates 34, as best shown in FIGS. 1 and 3 and bearing blocks 38 are mounted for movement on a pair of spaced vertical guide rods 39 which are connected to frame 17. The upper and lower ends of guide rods 39 are secured to clamps 40 that are mounted on braces 41 attached to frame 17.

Figure 5:
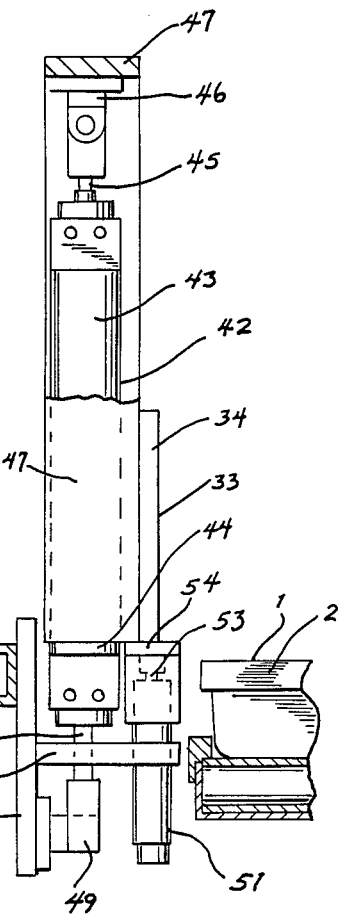
FIG. 5 is an enlarged fragmentary section taken along line 5—5 of FIG. 2.

To move the lift carriage 33 vertically, a pneumatic cylinder unit 42 interconnects the carriage with the frame 17. Cylinder unit 42 includes a pair of cylinders 43 and 44 which are disposed in aligned end-to-end relation. Piston rod 45 is slidable within upper cylinder 43 and the upper end of piston rod 45 is pivotally connected to a lug 46 which is attached to a generally U-shaped bracket 47 that extends upwardly from one of the side plates 34, as shown in FIGS. 1 and 5.

Piston rod 48, which is slidable in the lower cylinder 44, is pivotably connected to a lug 49 which is attached to plate 50 on frame 17. With this arrangement, each cylinder 43 and 44 will move the lift carriage. 33 in a stroke of movement.

A shock absorber 51 is employed to cushion the downward movement of lift carriage 33. As illustrated in FIG. 5, shock absorber 51 is secured to a bracket 52 connected to plate 50 and includes a plunger 53 which is mounted in a position to be contacted by plate 54 attached to the lower edge of side plate 34, as the lift carriage is lowered. Contact of plate 54 with plunger 53 of shock absorber 51 will act to cushion or dampen the impact of descent of carriage 33.

Figure 6:
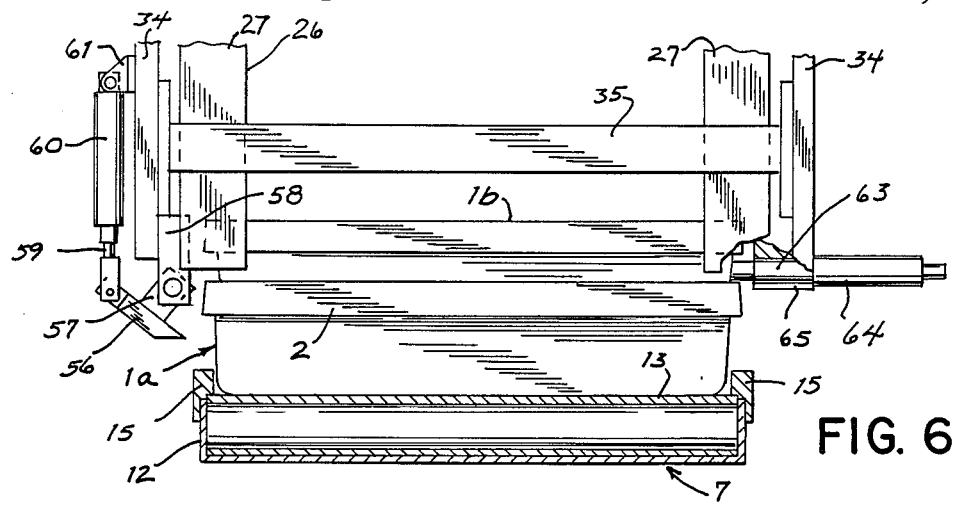
FIG. 6 is a schematic drawing of the unstacking operation showing the condition of the lifting members and holding members as the stack is received in the apparatus.

Two pair of pivotable lift bars 56 are associated with each side plate 34 of lift carriage 33. As best illustrated in FIG. 6, each lift bar 56 is carried by a bracket 57 which is pivotably connected to lug 58 that is attached to the lower edge of the respective side plate 34.

To pivot each lift bar 56, a piston rod 59 of a fluid cylinder 60 is pivotally connected to the outer end of the lift bar and the upper end of each cylinder is pivotally connected to plate 61 that is attached to side plate 34. By extending piston rod 59, lift bar 56 will be pivoted to a generally horizontal lifting position and by retracting piston rod 59, lift bar 56 will be pivoted to an inclined inoperative position.

Two pair of holding members or plungers 63 are associated with each side of the fixed guide frame 26. Each plunger 63 is mounted for movement in a cylinder 64 that is attached to a bracket 65 connected to frame 26. As will be hereinafter described, plungers 63, when in the extended position, will be located above the rim of the lowermost container to prevent vertical movement of the lowermost container and thus serve a stripping function.

Unstacking Operation

Figure 7:
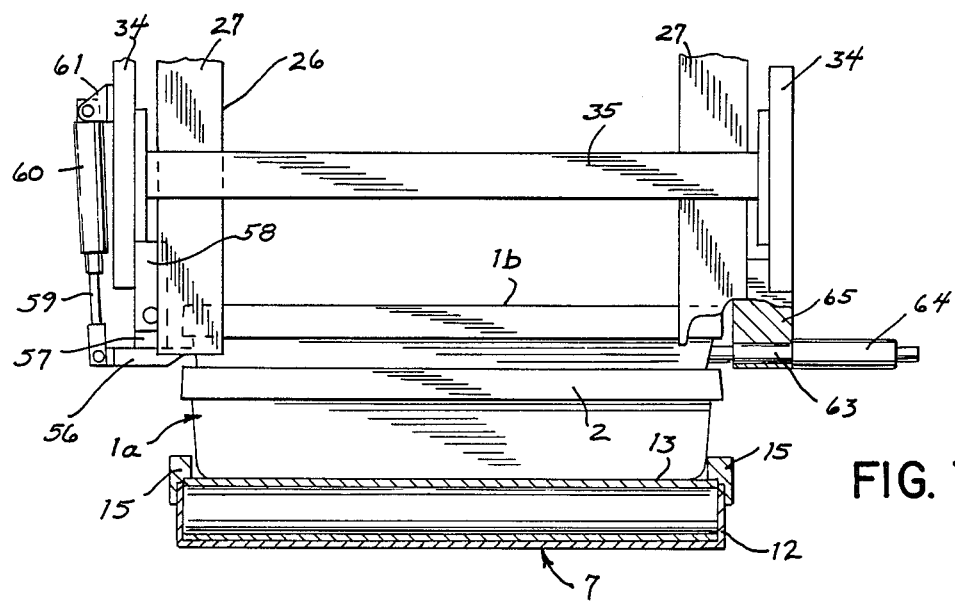
FIG. 7 is a view similar to FIG. 6 showing the lifting members in position to lift the stack from the lowermost container.
Figure 8:
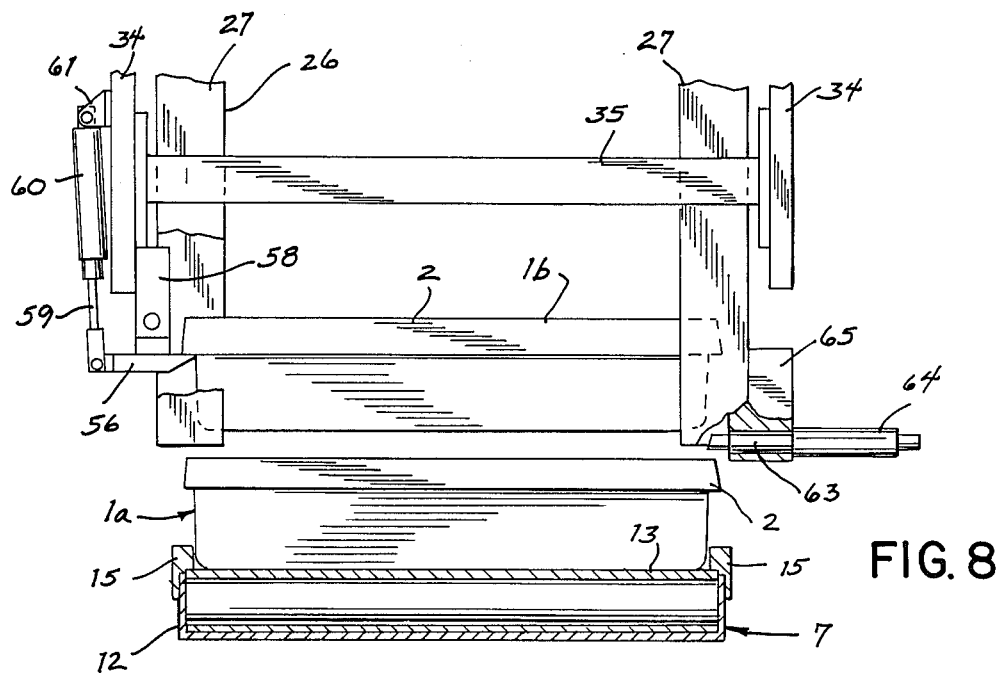
FIG. 8 is a view similar to FIG. 6 showing the stack lifted from the lowermost container and the holding members stripping the lowermost container.

FIG. 6-8 illustrate diagrammatically the unstacking operation. While these figures show only a single lift bar 56 and holding plunger 63, there are, as previously described, a pair of lifting bars 56 and holding plungers 63 positioned along each side edge of the guide frame 26.

With doors 24 in the open position, a stack 4 of containers is fed on conveyor 5 into the cabinet 16 and the leading edge of the stack will engage the angle sheet guides 27 to hold the stack on the moving conveyor. Doors 24 are then moved to the closed position by operation of cylinders 25, bringing the guide strips 31 into contacting or proximate relation with the trailing end of the stack.

As the stack is moved into the cabinet 16, the lift carriage 33 is in its lowermost position with lift bars 56 being pivoted to their inclined inoperative position and the holding plunger 63 being retracted, as shown in FIG. 6.

Cylinder 43 is then operated to extend piston rod 45 and move lift carriage 33 to the position shown in FIG. 7. Plungers 63 are then extended and lift bars 56 are then pivoted inwardly to the operative position beneath the rim on the second lowermost container 1b of the stack 4.

Cylinder 44 is then operated to extend piston rod 48, causing lift carriage 33 to move to its uppermost position and lifting the second container 1b upwardly from the lowermost container 1a, as shown in FIG. 8. The extended holding plungers 63 being located above the upper surface of the rim of the lowermost container 1a will prevent the lowermost container from moving upwardly with the stack and thus provide a stripping function.

With the stack elevated from the lowermost container 1a, as illustrated in FIG. 8, the container 1a is then in a ready position to be conveyed away on the conveyor 7.

After container 1a has been conveyed away, plungers 63 are retracted and lift carriage 33 is moved downwardly to its lowermost position bringing container 1b to rest on the conveyor 7 and the action is repeated to separate container 1b from the remainder of the stack.

By this method, each individual container is removed from the stack and discharged on conveyor 7.

It is contemplated that automated controls may be employed to feed the stacks 4 into the compartment. For example, each stack 4 can be retained on the moving conveyor 5 by a stop mechanism which can be moved between an obstructing position, where it obstructs movement of the stack on the conveyor, to a non-obstructing position. Suitable sensors can be incorporated to sense the presence of containers in the cabinet 16 and when all of the containers of the stack have been unstacked and conveyed away, the sensors can act to open the doors 24 and retract the stop to admit a new stack to the cabinet. The conveyors can also be programmed to shut down temporarily if containers are not needed in the conveying system.

Stacking Operation

The manner in which the apparatus can be used to stack containers is shown schematically in Figs. 9A–9F. The apparatus as used for stacking is identical to that employed for unstacking, except that in the stacking mode, the holding plungers 63 are mounted in a slightly higher position.

In stacking, the direction of travel of conveyors 5 and 7 is reversed and each individual container 1 is fed on conveyor 7 through opening 23 into the cabinet 16 and is stopped by the guide strip 31 on the closed doors 24.

Figure 9A:
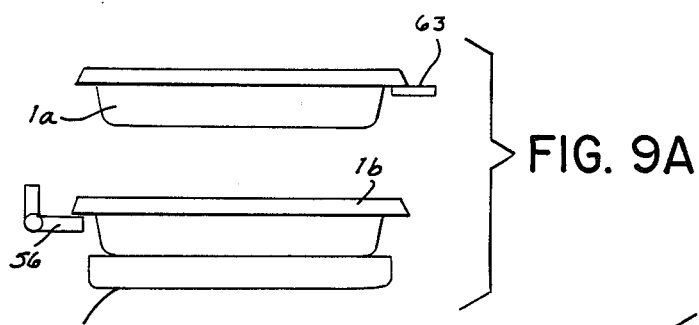
FIGS. 9A–9F are a series of schematic representations showing the stacking of containers.

FIG. 9A illustrates schematically the stacking operation in which a first container 1A has been received in compartment 18 and is being held in an elevated position by the holding plungers 63. As a second container 1B enters the compartment 18 in cabinet 16, lift carriage 33 is in its lowermost position and lift bars 56 are either in the downwardly inclined position or the horizontal position, as illustrated. With the carriage 33 in its lowermost position, lift bars 56, when horizontal, will be spaced slightly beneath the rim on the container 1B, as shown in FIG. 9A.

Figure 9B:
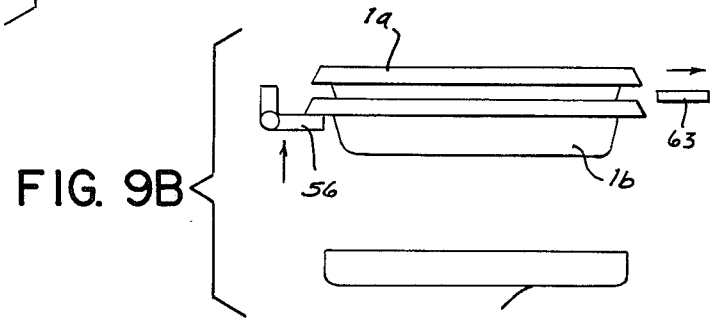

Carriage 33 is then elevated to a mid-position, causing lift bars 56 to elevate container 1B into a stacked relation with container 1A and take the weight off of plungers 63. With the stack being held by lift bars 56, holding plungers 63 are then retracted to a release position, as shown in FIG. 9B.

Figure 9C:
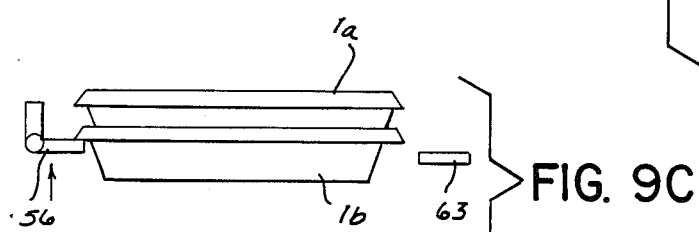

After retraction of holding plunger 63, carriage 33 is moved to its uppermost position, as shown in FIG. 9C, to cause lift bars 56 to lift the stack and move the rim on the lower container 1B of the stack above the level of the retracted holding plungers 63.

Figure 9D:
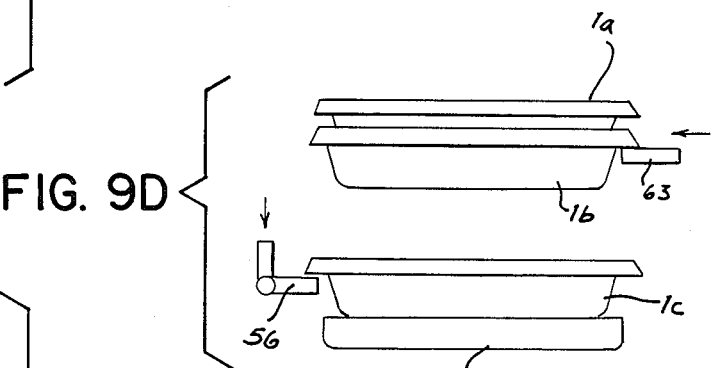

Holding plungers 63 are then moved to the extended or holding position, as shown in FIG. 9D, to hold the stack, and the lift bars 56 are pivoted downwardly and the lift carriage is then lowered to its lowermost position and the lift bars returned to the horizontal position beneath the rim of a third container 1C on conveyor 7, as illustrated in FIG. 9D. This procedure is repeated with each successive container being elevated and stacked with the previously stacked containers.

Figure 9E:
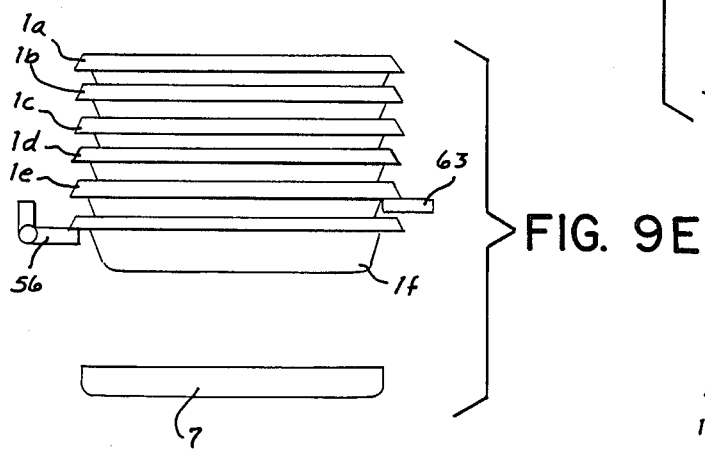
Figure 9F:
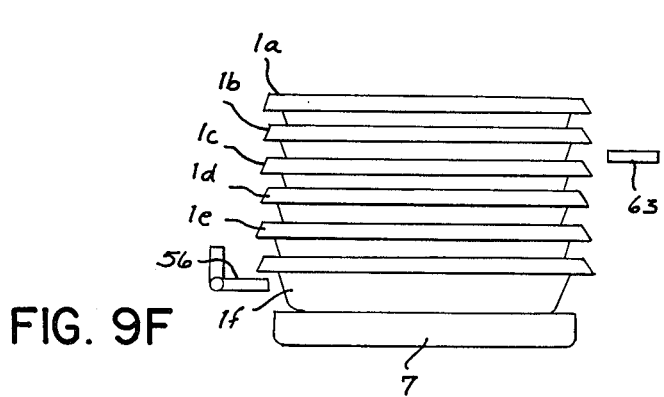

FIG. 9E illustrates the completion of the stack with the lowermost container 1F having been elevated into stacking relation with the prior stacked containers 1A–1E, by movement of the lift bars 56 to a mid-position. To lower the completed stack onto conveyor 7, holding plungers 63 are retracted to the release position, as shown in FIG. 9F, and lift carriage 33 is lowered to its lowermost position, with the stack being supported by the lift bars 56 as the stack is lowered onto the conveyor 7.

Various modes of carrying out the invention are contemplated as being within the scope of the following claims particularly pointing out and distinctly claiming the subject matter which is regarded as the invention.

I claim:

1. An apparatus for stacking or unstacking containers, said containers having laterally extending ledges, the ledges of stacked containers being vertically spaced, comprising a frame defining a compartment to contain a stack of containers, guide means on said frame to guide said stack in vertical movement in said compartment, conveyor means disposed beneath said compartment, lift means mounted for vertical movement relative to said guide means and disposed to engage a ledge on the container to lift said container above said conveyor means, holding means operably connected to said guide means and disposed to be inserted between the spaced ledges on stacked containers to hold one of said containers against vertical movement, said lift means including a carriage mounted for vertical movement, said lift means including a carriage mounted for vertical movement on the frame, and power operated means for moving the carriage relative to the frame, said power operated means comprising a pair of fluid cylinder units disposed in end-to-end relation, each cylinder unit including a cylinder and piston means slidable within the respective cylinder, the piston means of one of said cylinder units being connected to said frame and the piston means of the other of said cylinder units being connected to said carriage, individual operation of said cylinder units acting to move said carriage in increments.

* * * * *

UNITED STATES PATENT AND TRADEMARK OFFICE
CERTIFICATE OF CORRECTION

PATENT NO.  : 4,865,515

DATED       : September 12, 1989

INVENTOR(S) : WOLFGANG C. DORNER ET AL

It is certified that error appears in the above-identified patent and that said Letters Patent is hereby corrected as shown below:

Col. 6, Lines 38-39, CLAIM 1, After "movement" delete ", said lift means including a carriage mounted for vertical movement"

Signed and Sealed this

Sixth Day of August, 1991

Attest:

HARRY F. MANBECK, JR.

Attesting Officer

Commissioner of Patents and Trademarks